Nov. 6, 1951      A. H. DANIEL      2,574,172
TAIL BRACE
Filed Dec. 22, 1950
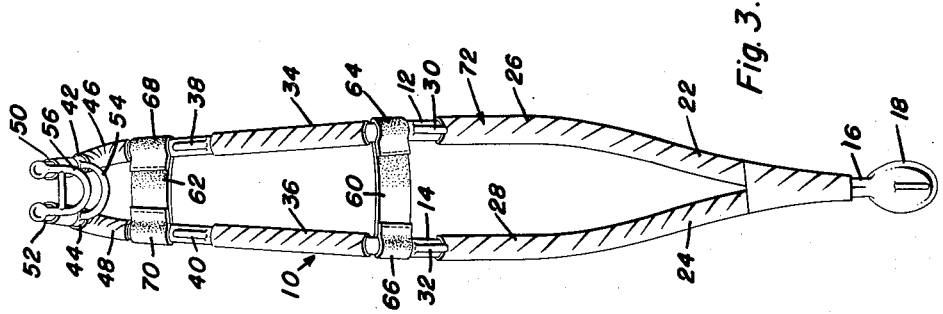
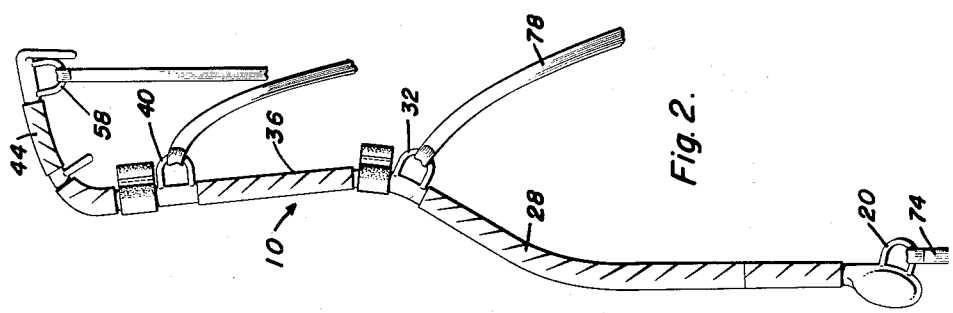
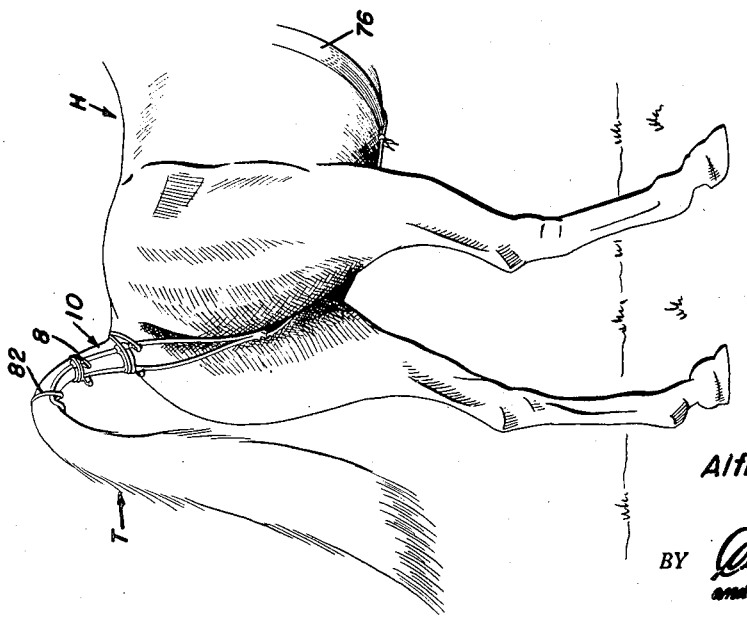
Alfred H. Daniel
INVENTOR.
BY *Clarence A. O'Brien*
*and Harvey B. Jackson*
Attorneys Patented Nov. 6, 1951

2,574,172

UNITED STATES PATENT OFFICE 2,574,172

TAIL BRACE

Alfred H. Daniel, Waynesville, Mo.

Application December 22, 1950, Serial No. 202,228

5 Claims. (Cl. 54—78)

1

The present invention relates to improvements in tail braces for horses or the like.

An object of the present invention is to provide an improved tail brace for show horses and which tail brace is comprised of a pair of rods secured together at their ends and angularly and arcuately related to each other at intermediate portions thereof whereby the tail brace will conform to the rear end of a horse.

A further object of the present invention is to provide a tail brace formed of a pair of rods having their lower ends joined together and angularly related to each other with the lower end of the rods having a knob secured thereto for engagement with the crotch of the horse below the rectum to provide a pivot for the tail brace without injuring the horse.

Still another object of the present invention resides in the provision of the knob end whereby positioning of the knob end in the crotch of the horse pivotally governs the top end of the brace which holds the tail of the horse in proper show position.

Various other objects and advantages will become apparent from the detailed description to follow. The best form in which I have contemplated applying my invention is clearly illustrated in the accompanying drawings, wherein:

Figure 1 is a rear elevational view of a show horse showing the tail brace mounted thereon with the horse's tail secured thereto by means of straps;

Figure 2 is a side elevational view of the tail brace; and

Figure 3 is a front elevational view of the tail brace.

Referring more particularly to the drawings, wherein like numerals designate like parts throughout, the numeral 10 designates generally the tail brace which is adapted to be mounted on the rear end of a horse H for securing the horse's tail T thereto to provide a proper show appearance.

The tail brace 10 is best shown in Figures 2 and 3 as comprising a pair of rods 12 and 14 having their lower ends integrally secured to each other at 16 and terminating in a knob 18 of oblate spheroid form. The knob 18 has a loop 20 secured thereto for a purpose to be hereinafter described.

The lower end portions of the rods 12 and 14, designated by the numerals 22 and 24 are angularly disposed with respect to each other and lie in a first plane. First intermediate portions 26 and 28 of the rods provide extensions to the lower

2 end portions 22 and 24, being arcuately joined thereto and angularly extending therefrom. The first intermediate portions 26 and 28 lie in a second plane which is angularly related to the above mentioned first plane and each of the first intermediate portions 26 and 28 are substantially parallel to each other.

The upper ends of the first intermediate portions have eyelets 30 and 32 secured thereto for a purpose to be hereinafter described.

Second intermediate portions 34 and 36 of the rods 12 and 14 integrally extend from the first intermediate portions 26 and 28, converge towards each other and lie in a plane angularly disposed with respect to the second plane and are in a plane almost parallel to the first plane, the angle between the first and third planes being approximately three to fifteen degrees. The second intermediate portions 34 and 36 are also provided with eyelets 38 and 40.

The upper end portions 42 and 44 of the rods 12 and 14 are arcuated with respect to the second intermediate portions 34 and 36, converge towards each other at 46 and 48 and are substantially parallel to each other at 50 and 52. The upper end portions 42 and 44 are joined together by a pair of arcuated wires 54 and 56 and each of the upper end portions 42 and 44 is formed with an eyelet 58.

The upper and lower ends of the second intermediate portions 34 and 36 are joined by leather straps 60 and 62 which have their end portions looped at 64, 66, 68 and 70 for receiving the rods 12 and 14. Substantially the entire length of each of the rods 12 and 14 is provided with a leather covering 72 or the like, other material being employed as desired.

Looking now at Figure 1, it will be seen that the tail brace is positioned on the rear end of the horse with the knob 18 disposed in the crotch of the horse halfway down from the rectum and providing a pivot point for the entire tail brace 10. The lower end of the tail brace has the eyelet 20 connected to the strap 74 which extends downwardly beneath the horse for attachment to the belt strap 76. The eyelets 30 and 32 are disposed adjacent the base of the tail T and have a strap 78 looped therethrough for engagement around the horse's tail. The upper eyelets 38, 40 and 58 have straps 80 and 82 looped therethrough for securing upper intermediate portions of the horse's tail to the tail brace.

Of course, although the arrangement shown in Figure 1 reveals the structure of the tail brace, the horse's tail may be disposed so that the hair will cover the tail brace to provide a pleasing show appearance.

From a consideration of the foregoing description and the accompanying drawings, it is believed that a device has been provided which will accomplish all of the objects hereinabove set forth. It will readily be seen that the knob 18 will provide a pivot point for the tail brace whereby movement of the horse's tail will not injure the horse. It will also be seen that the configuration of the tail brace will conform to the rear end of the horse in a humane fashion.

Having described the invention, what is claimed as new is:

1. A tail brace comprising a pair of rods, the lower ends of said rods being integrally joined together and angularly disposed relative to each other in a first plane, the lower ends of said rods being formed with a knob providing a pivot for engagement with the crotch of a horse first intermediate portions of said rods being arcuated and angulated with respect to said lower ends, second intermediate portions of said rods being arcuated and angulated with respect to said first intermediate portions, the upper ends of said rods being arcuated and inwardly converging, and means joining the free upper ends of said rods in spaced relation, said second intermediate portions being reversely arcuated from said first intermediate portions.

2. A tail brace comprising a pair of rods, the lower ends of said rods being integrally joined together and angularly disposed relative to each other in a first plane, the lower ends of said rods being formed with a knob providing a pivot for engagement with the crotch of a horse first intermediate portions of said rods being arcuated and angulated with respect to said lower ends, second intermediate portions of said rods being arcuated and angulated with respect to said first intermediate portions, the upper ends of said rods being arcuated and inwardly converging, and means joining the free upper ends of said rods in spaced relation, said second intermediate portions being reversely arcuated from said first intermediate portions, and said upper ends being reversely arcuated from said second intermediate portions.

3. A tail brace comprising a pair of rods, the lower ends of said rods being integrally joined together and angularly disposed relative to each other in a first plane, the lower ends of said rods being formed with a knob providing a pivot for engagement with the crotch of a horse first intermediate portions of said rods being arcuated and angulated with respect to said lower ends, second intermediate portions of said rods being arcuated and angulated with respect to said first intermediate portions, the upper ends of said rods being arcuated and inwardly converging, and means joining the free upper ends of said rods in spaced relation, said first intermediate portions being substantially parallel and lying in a second plane angularly related to the first plane of said lower ends.

4. A tail brace comprising a pair of rods, the lower ends of said rods being integrally joined together and angularly disposed relative to each other in a first plane, the lower ends of said rods being formed with a knob providing a pivot for engagement with the crotch of a horse first intermediate portions of said rods being arcuated and angulated with respect to said lower ends, second intermediate portions of said rods being arcuated and angulated with respect to said first intermediate portions, the upper ends of said rods being arcuated and inwardly converging, and means joining the free upper ends of said rods in spaced relation, said first intermediate portions being substantially parallel and lying in a second plane angularly related to the first plane of said lower ends, said second intermediate portions being non-parallel and converging from said first intermediate portions and lying in a third plane angularly related to said first and second planes.

5. A tail brace comprising a pair of rods, the lower ends of said rods being integrally joined together and angularly disposed relative to each other in a first plane, first intermediate portions of said rods being arcuated and angulated with respect to said lower ends, second intermediate portions of said rods being arcuated and angulated with respect to said first intermediate portions, the upper ends of said rods being arcuated and inwardly converging, and means joining the free upper ends of said rods in spaced relation, the lower ends of said rods being formed with a knob providing a pivot for engagement with the crotch of a horse.

ALFRED H. DANIEL.

REFERENCES CITED

The following references are of record in the file of this patent:

UNITED STATES PATENTS

| Number | Name | Date |
|---|---|---|
| 130,939 | Phillips | Aug. 27, 1872 |
| 770,188 | Rutherford | Sept. 13, 1904 |
| 1,563,844 | Ellis | Dec. 1, 1925 |
| 2,484,766 | Turner | Oct. 11, 1949 |